United States Patent
Ko

(10) Patent No.: US 7,374,325 B2
(45) Date of Patent: May 20, 2008

(54) BACKLIGHT MODULE COMPRISING A SHADING TAPE TO PREVENT LEAKING LIGHT FROM THE LATERAL SIDES OF THE BACKLIGHT MODULE

(75) Inventor: Chun-Min Ko, Hemei Township, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 11/342,994

(22) Filed: Jan. 30, 2006

(65) Prior Publication Data

US 2006/0291242 A1  Dec. 28, 2006

(30) Foreign Application Priority Data

Jun. 22, 2005 (TW) ............... 94120863 A

(51) Int. Cl.
*F21V 7/04* (2006.01)

(52) U.S. Cl. .............. 362/607; 362/618; 362/633

(58) Field of Classification Search .......... 362/607, 362/633, 600, 606, 611, 612, 627, 632, 634, 362/618; 349/59
See application file for complete search history.

(56) References Cited

U.S. PATENT DOCUMENTS

| 6,835,961 | B2* | 12/2004 | Fukayama | 257/84 |
| 6,847,417 | B2* | 1/2005 | Kim | 349/58 |
| 6,950,154 | B2* | 9/2005 | Lee | 349/58 |
| 2004/0246397 | A1* | 12/2004 | Kang et al. | 349/58 |
| 2007/0188674 | A1* | 8/2007 | Aramatsu | 349/58 |
| 2007/0217219 | A1* | 9/2007 | Makuta et al. | 362/606 |

FOREIGN PATENT DOCUMENTS

| CN | 1731251 | | 2/2006 |
| JP | 2002-098945 | | 4/2002 |
| JP | 2002235053 A | * | 8/2002 |
| JP | 2003084282 | | 3/2003 |
| JP | 2004059723 A | * | 2/2004 |
| JP | 2007168354 A | * | 7/2007 |

OTHER PUBLICATIONS

"Polyethyleneterephthalate (Polyester, PET, PETP)—Material Information," www.goodfellow.com/csp/active/STATIC/E/Polyethylene_terephthalate.HTML, accessed Nov. 14, 2007.*
English language translation of abstract and pertinent part of CN 1731251.
English language translation of abstract and pertinent part of JP 2003084282.

* cited by examiner

*Primary Examiner*—Y M Lee
*Assistant Examiner*—Leah S. Lovell
(74) *Attorney, Agent, or Firm*—Thomas, Kayden, Horstemeyer & Risley

(57) ABSTRACT

A backlight unit applied on a display device is disclosed. The backlight unit includes a base having a frame, an optical film, an adhesive and a shading tape. The frame has at least a recess, and the optical film has at least a flange for inserting in the recess of the frame. The shading tape locates on the frame, and the adhesive locates between the frame and the shading tape only. No adhesive exists between the optical film and the shading tape.

11 Claims, 4 Drawing Sheets

BACKLIGHT MODULE COMPRISING A SHADING TAPE TO PREVENT LEAKING LIGHT FROM THE LATERAL SIDES OF THE BACKLIGHT MODULE

RELATED APPLICATIONS

The present application is based on, and claims priority from, Taiwan Application Ser. No. 94120863, filed Jun. 22, 2005, the disclosure of which is hereby incorporated by reference herein in its entirety.

BACKGROUND OF THE INVENTION

1. Field of Invention

The present invention relates to a display device. More particularly, the present invention relates to a backlight unit of a liquid crystal display.

2. Description of Related Art

In the present market, the liquid crystal display (LCD) has many fields of application, including communications, hand-held mobile devices, dash-mounted displays in vehicles, monitors, notebooks and personal computers. Hence, LCDs could totally replace CRT monitors in the predictable future.

In small LCDs of hand-held mobile devices, a backlight unit and an LCD panel are combined by a black shading tape having adhesive on both surfaces thereof. Furthermore, the light source of any small LCD is usually located on a side of the LCD. Therefore, the backlight unit needs a light diffuser or prism sheet on the top thereof to diffuse light uniformly to properly backlight the LCD.

However, the shading tape is located on the light diffuser or prism sheet. If the LCD needs to be reworked, the light diffuser or the prism sheet is damaged when the shading tape is taken off. Hence, a light diffuser or a prism sheet is wasted, and the product cost is thus increased.

SUMMARY OF THE INVENTION

In one aspect, the present invention provides a backlight unit to keep an optical film intact when a shading tape is removed from the optical film to rework the LCD.

In accordance with the foregoing and other aspects of the present invention, a backlight unit applied on a display device is provided. The backlight unit includes a base having a frame, an optical film, an adhesive layer and a shading tape. The frame has at least a recess, and the optical film has at least a flange for inserting in the recess of the frame. The shading tape locates on the frame, and the adhesive layer locates between the frame and the shading tape only. No adhesive exists between the optical film and the shading tape.

Furthermore, a light guide plate and a reflector can be sequentially located under the optical film; and another adhesive layer can be located on the shading tape.

In accordance with the foregoing and other aspects of the present invention, a backlight module is further provided. The backlight module includes the backlight unit described above and at least a light source located near an edge of the optical film.

In the foregoing, since no adhesive exists between the optical film and the shading tape, the optical film can be kept intact without any damage when the shading tape is removed from the frame.

It is to be understood that both the foregoing general description and the following detailed description are made by use of examples and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention provides a backlight unit to keep an optical film intact when a shading tape is removed from frame to rework the LCD.

Figure 1A:
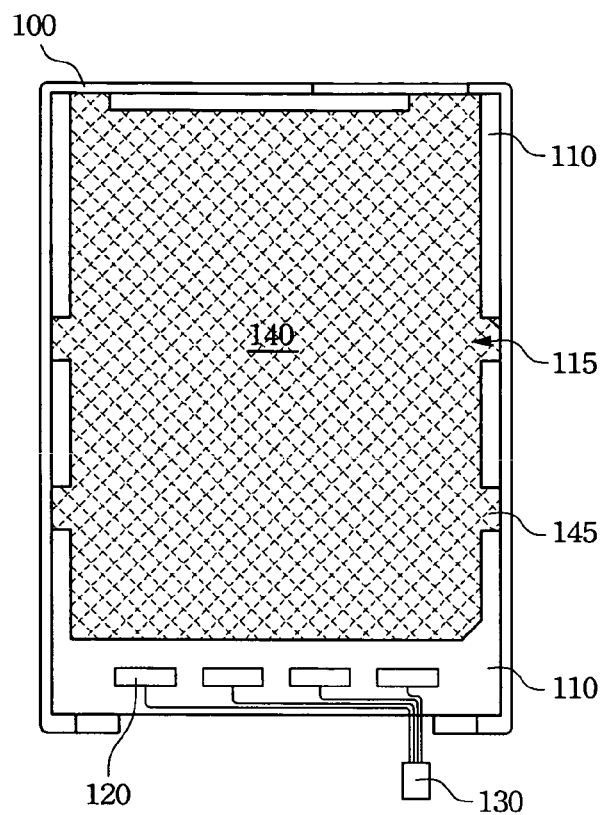
FIGS. 1A-1D are vertical views of components of a backlight module according to a preferred embodiment of this invention.

FIGS. 1A-1D are vertical views of components of a backlight module according to a preferred embodiment of this invention. In FIG. 1A, an interior of a base 100 has a frame 110, and the frame has several recesses 115. Several light sources 120, such as light emitting diodes, are located on one side of the frame 110. The light sources 120 are electrically connected to a printed circuit board 130. An optical film 140, such as a light diffuser, is inlaid in the frame 110. The optical film 140 has several flanges 145 to inlay in the recesses 115 of the frame 110, respectively. Below the optical film 140, a light guide plate 136 (shown in FIGS. 3A and 3B) and a reflector 132 (shown in FIGS. 3A and 3B) are sequentially located.

Figure 1B:
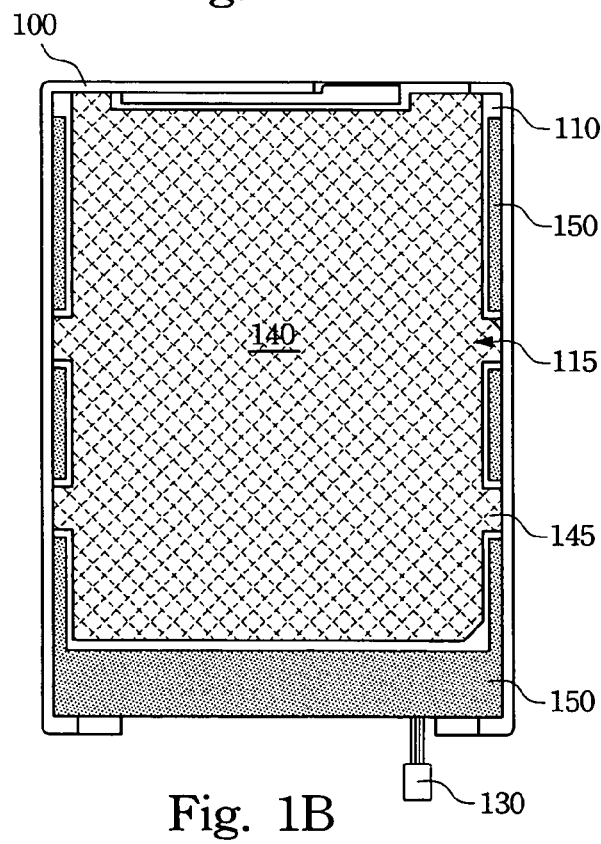

In FIG. 1B, an adhesive layer 150 only covers a portion of the frame 110 of the components in FIG. 1A. There is no adhesive layer 150 on the optical film 140. The adhesive layer 150 is, for example, a single adhesive layer or a double-faced adhesive tape.

Figure 1C:
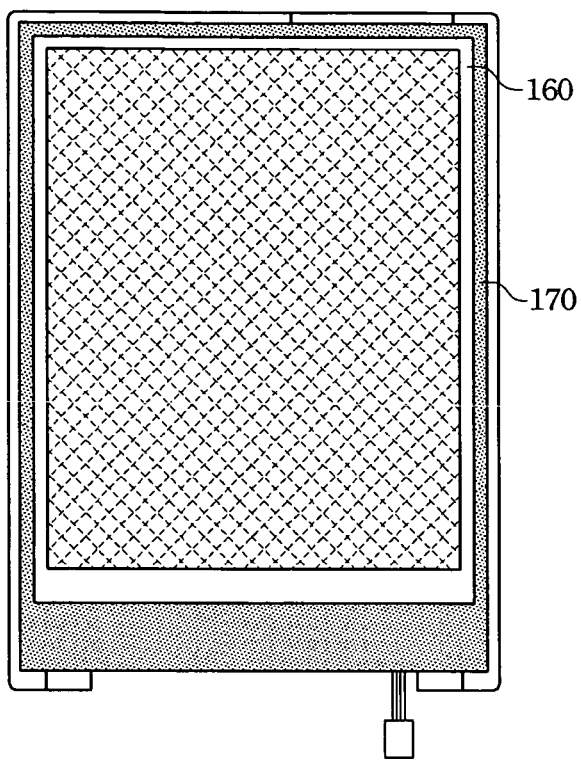
Figure 2:
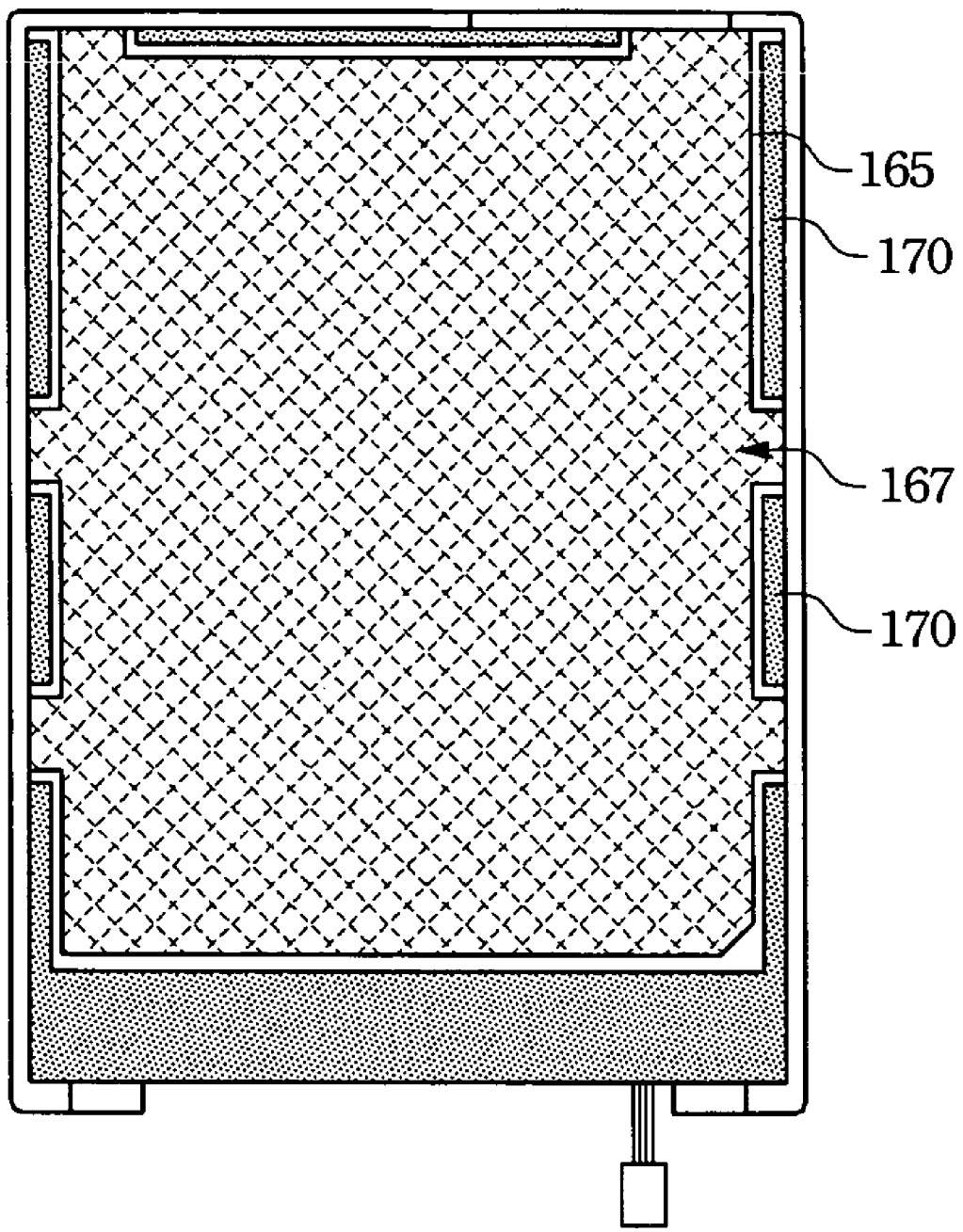
FIG. 2 is a vertical view of covering a shading tape on the backlight unit in FIG. 1B.

In FIG. 1C, a shading tape 160 covers the adhesive layer 150, the frame 110 and a portion of the optical film 140 in FIG. 1B. The shading tape 160 is used to prevent leaking light from the lateral sides of the backlight module so as to maintain the brightness of the backlight module. The shading tape 160 may be opaque. The shading tape 160 can cover frame 110 only, as shown in FIG. 2, wherein the shading tape 165 has several recesses 167 located on the recesses 115 of the frame 110 accordingly. Then, another adhesive layer 170 is coated on the shading tape 160 in FIG. 1C or the shading tape 165 in FIG. 2. The adhesive layer 170 can fully cover (not shown) the shading tape 160 or partially cover the shading tape 160.

Figure 1D:
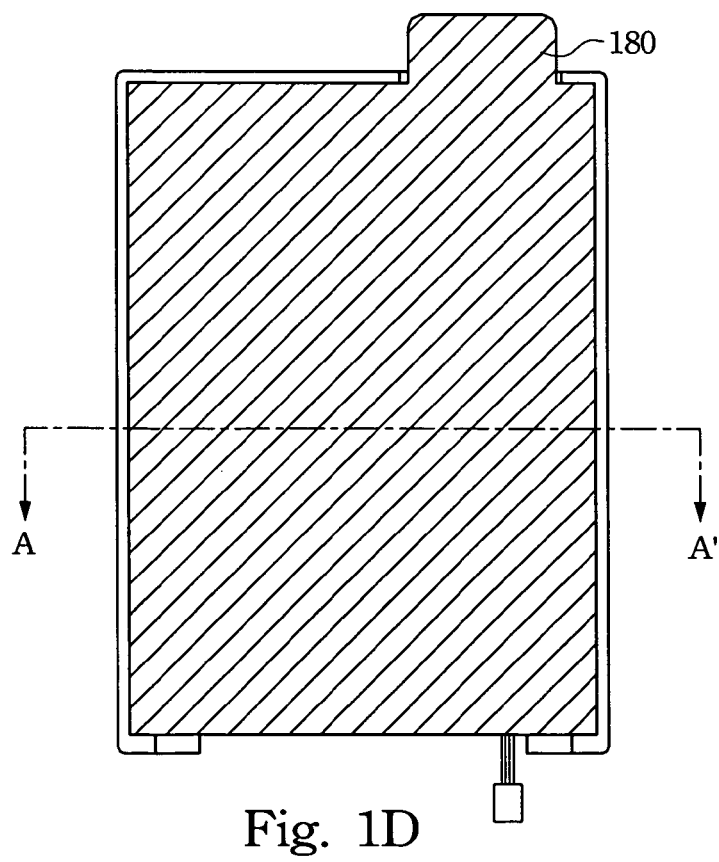

In FIG. 1D, a protecting film 180 covers the components in FIG. 1C or FIG. 2. The protecting film 180 can temporarily protect the optical film 140 from dust before the backlight module is assembled with an LCD module. When the backlight module is assembled with an LCD module, the protecting film 180 has to be taken off. Then, the LCD module is placed on the backlight module to complete the assembling procedure.

Figure 3A:
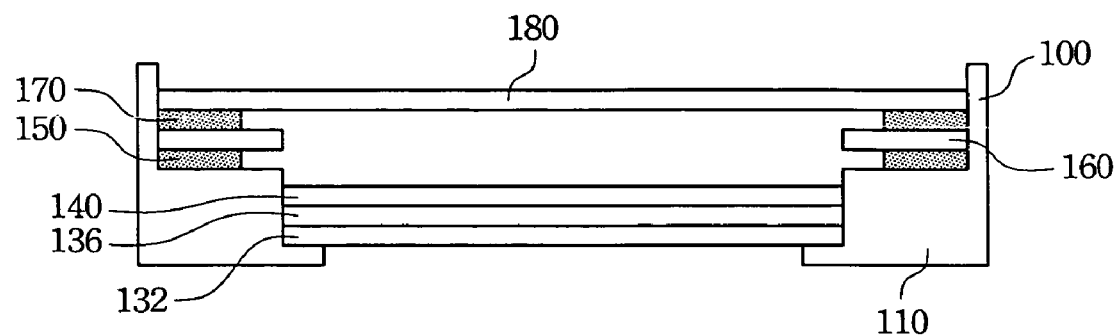
FIGS. 3A and 3B are cross-sectional views along line A-A' in FIG. 1D.
Figure 3B:
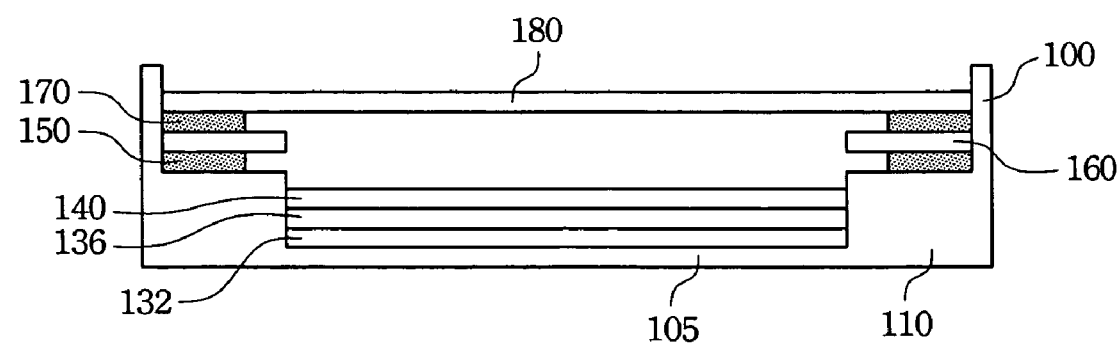

The interior of the frame 110 of the base 100 is solid as a bottom plate or is open. FIGS. 3A and 3B are cross-sectional views along line A-A' in FIG. 1D. In FIG. 3A, the interior of the frame 110 of the base 100 is open, such that the reflector 132, the light guide plate 136, and the optical film 140 are only partially supported. In FIG. 3B, the interior of the frame 110 of the base 100 is a solid bottom plate 105, such that the reflector 132, the light guide plate 136, and the optical film 140 can be fully supported by the bottom plate 105.

In light of the preferred embodiments described above, an adhesive layer is located on the frame of the base, and no adhesive layer is on the optical film. Therefore, the optical film can remain intact without any damage after the shading tape is taken off for reworking an LCD. Consequently, significant production cost and time can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
    a base having a frame with at least one recess;
    at least one optical film, located in the base, having at least one flange to inlay in the recess of the frame;
    at least a shading tape located only on a top surface of the frame, not on the recess of the frame, wherein the shading tape is substantially opaque to prevent leaking light from the lateral sides of the backlight module;
    an adhesive layer located only between the shading tape and the frame to contact the shading tape and the frame only; and
    at least one light source located near an edge of the at least one optical film.

2. The backlight module of claim 1, wherein the at least one optical film comprises a light diffuser.

3. The backlight module of claim 1, wherein the base has an opening surrounded by the frame.

4. The backlight module of claim 1, wherein the light source comprises a light emitting diode.

5. The backlight module of claim 1, further comprising a circuit board electrically connected to the light source.

6. The backlight module of claim 1, wherein the light source is located on the base.

7. The backlight module of claim 6, further comprising a circuit board electrically connected to the light source.

8. The backlight module of claim 1, further comprising a light guide plate located below the at least one optical film.

9. The backlight module of claim 8, further comprising a reflector located below the light guide plate.

10. The backlight module of claim 1, wherein the shading tape is single and continuous.

11. A backlight module, comprising:
    a base having a frame with at least one first recess;
    at least one optical film, located in the base, having at least one flange to inlay in the first recess of the frame;
    a single continuous shading tape located on the frame and disposed to surround a perimeter of the optical film;
    an adhesive layer located between the shading tape and the frame to contact the shading tape and the frame only; and
    at least one light source located near an edge of the at least one optical film.

* * * * *